United States Patent [19]

Dakus

[11] 4,172,478
[45] Oct. 30, 1979

[54] DELIMBING APPARATUS

[75] Inventor: Harold Dakus, Prince George, Canada

[73] Assignee: Limmer Enterprises Ltd., Prince George, Canada

[21] Appl. No.: 728,410

[22] Filed: Sep. 30, 1976

[30] Foreign Application Priority Data

Oct. 22, 1975 [CA] Canada .................................. 238178

[51] Int. Cl.² ............................................. B27L 1/00
[52] U.S. Cl. .............................. 144/2 Z; 144/208 R; 144/309 AC
[58] Field of Search ............ 144/2 Z, 309 AC, 208 R, 144/3 D

[56] References Cited

U.S. PATENT DOCUMENTS

| 3,719,217 | 3/1973 | Bottoms | 144/2 Z |
| 3,805,858 | 4/1974 | Morin | 144/2 Z |
| 3,828,835 | 8/1974 | Cross, Sr. | 144/2 Z |
| 3,868,981 | 3/1975 | Nadeau | 144/2 Z |
| 3,951,188 | 4/1976 | Dawson | 144/2 Z |

FOREIGN PATENT DOCUMENTS 843197 6/1970 Canada .................................. 144/2 Z Primary Examiner—Donald R. Schran
Assistant Examiner—W. D. Bray
Attorney, Agent, or Firm—Owen, Wickersham & Erickson

[57] ABSTRACT

The invention provides a tree delimbing apparatus suitable for mounting on a vehicle. A frame bears a plurality of delimbing arms which are pivotally mounted and spring loaded on the frame. They extend outwardly from the frame so as to engage the branches of felled trees. The trees are suitably oriented parallel on the ground and then the vehicle bearing the delimbing apparatus passes over the felled trees, the frame moving along the tree trunks and the spring loaded delimbing arms accommodating themselves to varying diameters of tree trunk as the frame passes over the trunks. The delimbing arms are rigidly supported in the direction of motion and thus strip off the tree branches as the frame moves along the trunks.

10 Claims, 6 Drawing Figures

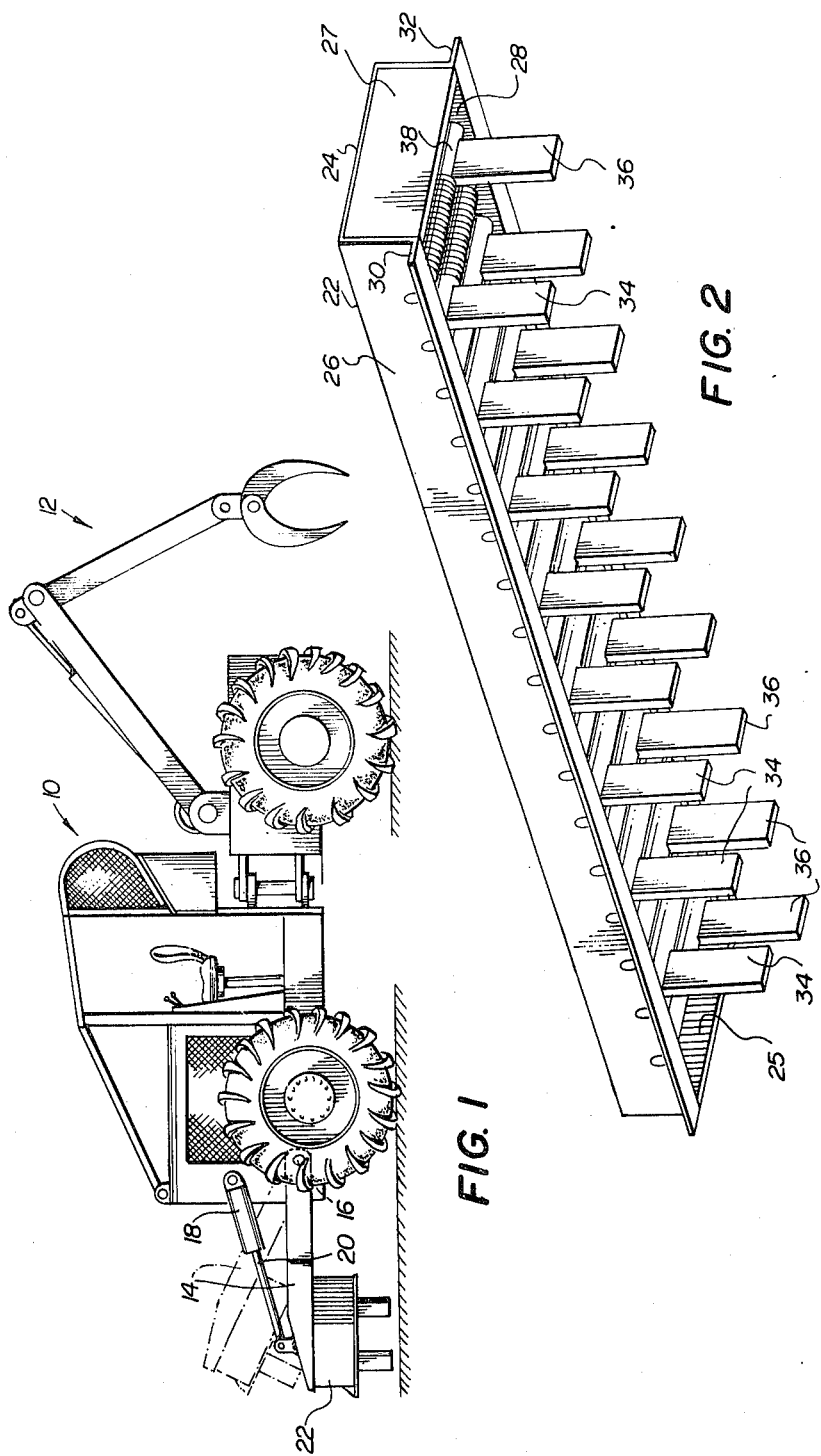

DELIMBING APPARATUS

BACKGROUND OF INVENTION

This invention relates to delimbing apparatus for use in delimbing felled trees.

A number of different kinds of delimbing apparatus are known in the logging art. Some of these require the use of choker cables for the purpose of drawing the felled trees through the delimbing apparatus. Choker cables are inconvenient to use, requiring a good deal of time and labour for the attaching and detaching of the cables. Other machines are known which are capable of delimbing individual felled trees, using knives or rigidly mounted breaking elements to strip the branches from the trees.

SUMMARY OF THE INVENTION

The present invention provides a delimbing apparatus which may conveniently be used on a vehicle and is adapted to delimb several trees simultaneously. To this end, the felled trees are arranged to lie generally parallel on the ground, and the vehicle bearing the apparatus according to the invention passes over them. As the vehicle passes over them, the delimbing apparatus simultaneously strips branches from the group of felled trees.

To this end, the invention comprises a frame and a plurality of delimbing arms pivotally mounted on the frame and protruding outwardly therefrom. The pivotally mounted arms are restrained from movement parallel to the pivotal axis so as to provide a rigid breaking arm or slicing arm (either a breaking or slicing element could be used as desired). These delimbing arms are spaced from one another by approximately the average diameter of the tree trunks for which the apparatus is designed. However, since the individual delimbing arms are pivotally mounted, they are able to accommodate themselves to varying diameters of tree trunk, at least within certain limits. These pivotally mounted delimbing arms are preferably spring loaded on the frame so that they are biased to their normal outwardly protruding orientation, or rest position. Furthermore, the spring loading tends to ensure that the delimbing arms maintain fairly close contact with the tree trunk as the delimbing process is being effected.

The delimbing apparatus may conveniently be mounted on a vehicle supporting the same in much the same manner as a plow is mounted on a bulldozer, i.e. on hydraulically-actuated extending arms. The vehicle may conveniently be an articulated vehicle provided with a conventional boom and grapple arrangement at one end for grasping a group of trees and laying them generally parallel on the ground, and having the frame and delimbing in accordance with the invention mounted at the other end of the vehicle. Once the trees are arranged on the ground, the vehicle preferably moves from the top of trees down to the cut-off ends of the trees, with the frame and delimbing arms being lowered for fairly close contact with the tree trunks at the front end of the vehicle as it moves over the trees, whereby the frame and delimbing apparatus remove branches from the trees as the vehicle passes over the trees.

It has been found that improved delimbing results when the delimbing arms are alternately mounted in parallel rows, the rows being generally perpendicular to the pivot axes.

SUMMARY OF THE DRAWINGS

FIG. 1 is a side elevation view of an articulated vehicle including a conventional boom and grapple arrangement at one end and an embodiment of the frame and delimbing apparatus in accordance with an embodiment of the present invention at the other end.

FIG. 2 is a perspective view of the frame and spring-loaded pivotally mounted delimbing elements in accordance with one embodiment of the present invention.

DETAILED DESCRIPTION WITH REFERENCE TO THE DRAWINGS

Figure 3:
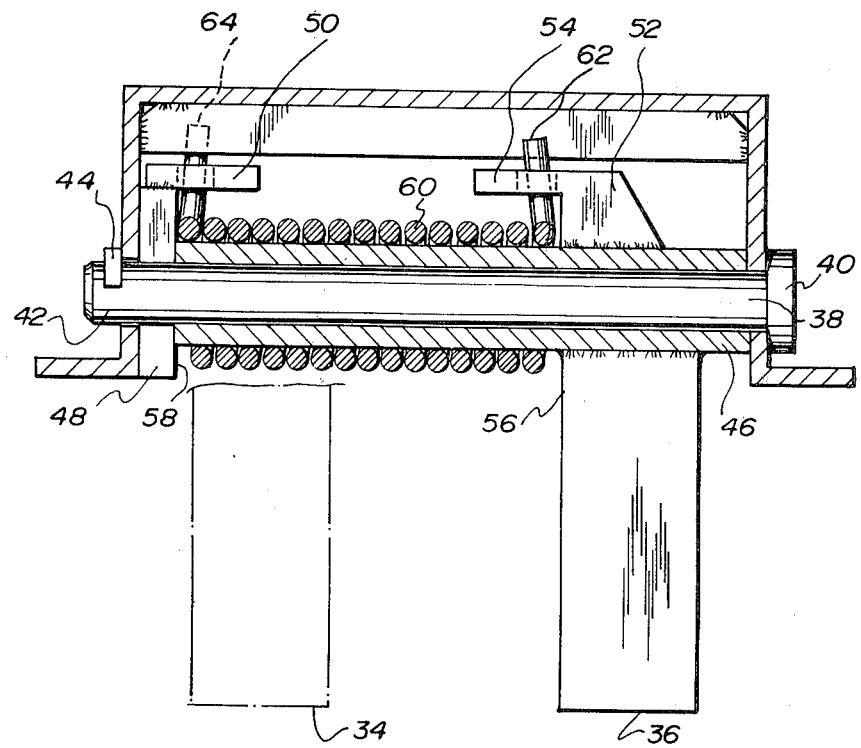
FIG. 3 is a side section view of the frame and a representative delimbing element of the embodiment of FIG. 2.

In FIG. 1 an articulated vehicle 10 is shown of the type frequently used in logging operations and sometimes referred to as a "skidder". At one end of the vehicle 10 is provided a conventional boom and grapple arrangement generally indicated as 12. At the other end of the vehicle support arms 14 are pivotally mounted to extend forward of the vehicle (to the left as illustrated in FIG. 1). The support arms 14 are movable about pivot axis 16 by means of a conventional hydraulic cylinder 18 and connecting piston extension 20.

On the underside of support 14 a frame 22 is mounted whose structure is illustrated in greater detail in FIG. 2. The frame 22 has a solid upper wall 24, solid front and back walls 26, 28 and front and rear flanged portions 30, 32. The frame is suitably provided with end walls such as end wall 25, 27 respectively. These may be welded or bolted into the rest of the frame, which may be a single generally U-shaped steel channel element. Pivotally mounted between the front and rear walls 26, 28 are a plurality of protruding delimbing elements. They are arranged alternately in two rows, those in the front row being designated by reference numeral 34 and those in the back row being designated by reference numeral 36.

The delimbing elements 34 and 36 are pivotally mounted about shafts 38 located in opposing holes in the front and rear walls 26, 28 of the frame 22. These shafts may conveniently be provided with one flanged end 40 (see FIG. 3) and the other end 42 of the shaft 38 may conveniently have an outer diameter just slightly smaller than the diameter of the holes in the walls 26, 28 into which the shaft 38 is located. A locking key 44 or the like retains the shaft 38 in position.

Each delimbing element 36 may conveniently be welded or otherwise securely fixed to a cylindrical sleeve 46 rotatably mounted on the shaft 38. One end of the sleeve 46 abuts against either the front wall 26 or rear wall 28, and the other end of the sleeve 46 is provided with a collar 48 welded or otherwise fixed to the frame 22. The collar 48 is provided with an inwardly-directed projecting apertured flange 50. The delimbing element fixed to the sleeve 46 is provided with an upper extension 52 which is provided with an inwardly directed apertured flange 54 pointing generally at the flange 50.

Between the inner surface 56 of the delimber element and the inner surface 58 of the collar 48, a coil spring 60 is located, wrapped around the sleeve 46. The extremities of the coil spring 60 are continued as spring extension elements 62, 64. The spring extension 62 is anchored in the apertured flange 54 and the spring extension 64 is anchored in the apertured flange 50 so as to maintain the delimbing element in its normal generally vertically downward position. If the delimbing element is deflected about its pivotal axis by a deflecting force, coil spring 60 will be stressed and will resist the deflecting force, tending to return the delimbing element to its normal generally vertically downward orientation, or rest position once the deflecting force is removed.

Figure 4:
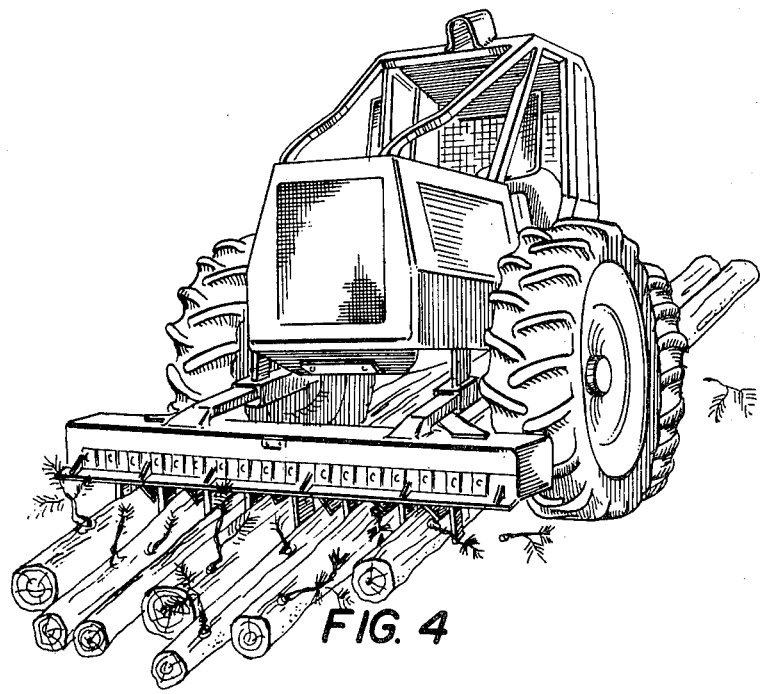
FIG. 4 is a perspective view of a vehicle provided with the delimbing apparatus of FIG. 2, in operating condition.
Figure 5:
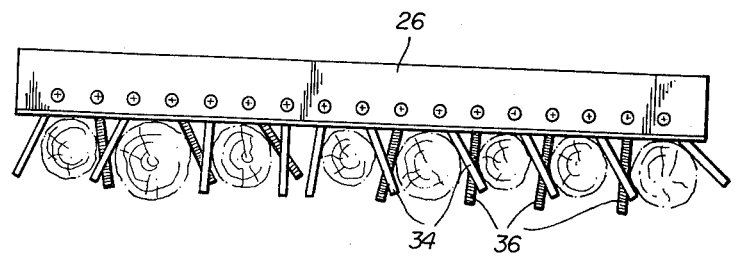
FIG. 5 is a schematic front view of the embodiment of FIG. 2 showing the manner in which the individual delimbing arms are able to deflect to accommodate tree trunks of varying diameters.

In operation, the vehicle 10 uses its boom and grapple to arrange a plurality of felled trees with their trunks generally parallel to one another along the ground. The vehicle 10 then passes over the trees with the frame 22 in the lead and making contact with the tree trunks, preferably proceeding from the top of the felled trees towards the cut-off base. FIG. 4 illustrates the vehicle moving in this direction. The hydraulic support arrangement for the support arms 14 is slackened to permit the frame 22 to make contact with the trunks of the felled trees. The vehicle 10 then advances longitudinally along the trunks, the delimbing elements 34 and 36 breaking off or slicing branches from the trees as the vehicle 10 passes over the tree trunks. Preferably as many trees are laid out on the ground at one time as conveniently can be accommodated by the width of the frame 22. Since the spacing of the felled trees is unpredictable and since the diameters of the felled trees will vary within a certain range, the spring loaded delimbing elements 34 and 36 will in general have to deflect a certain extent to accommodate the tree trunks between them. FIG. 5 illustrates schematically this accommodation of tree trunks of varying spacing and diameter by the delimbing elements. Because of the delimbing elements are spring loaded, they will tend to maintain contact with the tree trunks, provided that the spacing of the delimbing elements is approximately the same as the average diameter of the tree trunks and provided that the range of diameters of the tree trunks is not too extreme. Generally speaking, the spacing between adjacent delimbing elements will be chosen to accommodate the average tree trunk diameter for which the delimbing apparatus is intended.

It will be noted that since the delimbing elements 34 and 36 are welded or otherwise fixed to the sleeves 46, they are unable to deflect in the direction of movement of the vehicle 10 with respect to the felled trees, and thus they are effective to break or slice the branches from the trees. The delimbing elements in the shape of rectangular parallelepiped made of steel or other suitable material, as illustrated in FIG. 2, are suitable for breaking off the limbs of the felled trees. They could be provided with sharpened edges for slicing off the limbs, but in general the breaking rather than the slicing action is preferred simply to avoid the nuisance of having to sharpen the slicing elements from time to time.

By providing the delimbing elements in two parallel rows, a more effective delimbing is obtained, since the second row of delimbing elements can sometimes break off branches which were missed by the first row of delimbing elements because the first row elements were engaged with other branches. In other words, having the second row of delimbing elements tends to facilitate a more complete removal of branches from the trees than would be the case if only a single row of delimbing elements were used. A third row or additional rows of delimbing elements could be provided if desired.

Figure 6:
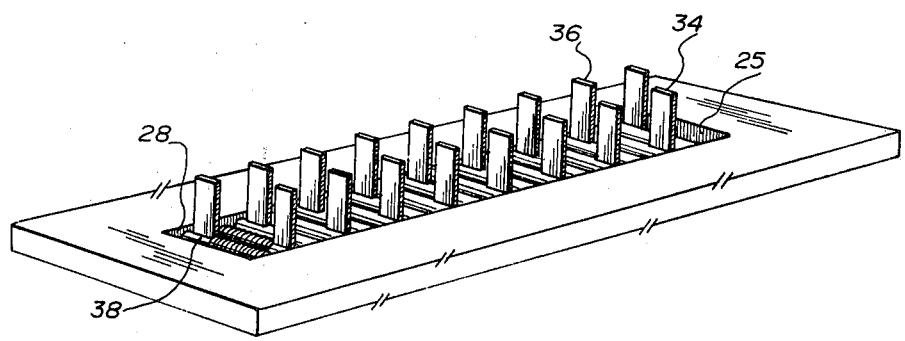
FIG. 6 is an alternative embodiment of delimbing apparatus according to the invention showing the delimbing arms extending vertically upward from the frame.

Alternatively, instead of being mounted upon a vehicle, the delimbing apparatus of FIG. 2 could be inverted and mounted on a suitable platform so that the felled trees could be drawn over the delimbing device instead of having the delimbing device pass over the felled trees. Such an arrangement is illustrated in FIG. 6.

Other modifications and variations of the apparatus illustrated and described herein will occur to those skilled in the art. The invention is not to be construed as limited to the specific embodiments described but it is to be given the full scope set forth in the appended claims.

What is claimed is:

1. In apparatus for delimbing trees, the combination comprising:

a frame; and at least three delimbing arms individually pivotally mounted on the frame in spaced relationship and pivoting about generally parallel pivotal axes, and being restrained from movement relative to the frame parallel to the pivotal axes, and protruding from the frame in generally the same direction and with generally the same orientation when in their rest positions;

at least one of the delimbing arms being mounted for pivotal deflection away from its rest position in either direction, to remove branches simultaneously from two adjacent generally parallel tree trunks when positioned therebetween and moved longitudinally relative thereto;

wherein the frame is operable to be moved longitudinally along the trunks of a plurality of felled trees whose trunks are placed side by side and oriented generally parallel to the pivotal axes, whereby at least some of the protuding delimbing arms remove branches from the said plurality of trees as the frame is so moved.

2. The combination of claim 1, additionally comprising biasing means which bias the delimbing arms towards their rest positions, whereby the delimbing arms tend to resume their rest positions following pivotal deflection.

3. The combination of claim 2, wherein the biasing means comprise springs.

4. The combination of claim 3, wherein the pivotal axes of the delimbing arms are spaced from one another by a substantially uniform distance.

5. The combination of claim 4, wherein the delimbing arms protrude from the frame by substantially the same distance.

6. The combination of claim 5, wherein the delimbing arms are alternately mounted in parallel rows, the rows being generally perpendicular to the pivotal axes.

7. Vehicular apparatus for skidding and delimbing trees comprising:

a vehicle for straddling a plurality of felled trees whose trunks are placed side by side, said vehicle having a boom and grapple apparatus at one end thereof for moving felled trees, and at the other end thereof having delimbing apparatus comprising a frame movably supported by the vehicle, and at least three delimbing arms individually pivotally mounted on the frame in spaced relationship and pivoting about generally parallel pivotal axes, and being restrained from movement relative to the frame parallel to the pivotal axes, and protruding from the frame in generally the same direction and with generally the same orientation when in their rest positions;

at least one of the delimbing arms being mounted for pivotal deflection away from its rest position in either direction, to remove branches simultaneously from two adjacent generally parallel tree trunks when positioned therebetween and moved longitudinally relative thereto;

wherein the vehicle is operable to move the frame of the delimbing apparatus longitudinally along the trunks of a plurality of felled trees whose trunks are placed side by side and oriented generally parallel to the pivotal axes, whereby at least some of the protruding delimbing arms remove branches from the said plurality of trees as the frame is so moved.

8. The vehicular apparatus of claim 7, wherein the vehicle is an articulated vehicle and the boom and grapple apparatus is located on one articulated portion of the vehicle and the delimbing apparatus is on the other articulated portion of the vehicle.

9. The vehicular apparatus of claim 7, wherein:

the delimbing apparatus additionally comprises spring means which bias the delimbing arms towards their rest positions, whereby the delimbing arms tend to resume their rest positions following pivotal deflection;

the axes of pivotation of the delimbing arms are spaced from one another by a substantially uniform distance; and the delimbing arms protrude from the frame by substantially the same distance, and are alternately mounted in parallel rows, the rows being generally perpendicular to the axes of pivotation.

10. The vehicular apparatus of claim 9, wherein the vehicle is an articulated vehicle and the boom and grapple apparatus is located on one articulated portion of the vehicle and the delimbing apparatus is on the other articulated portion of the vehicle.

* * * * *